United States Patent
Szefi (10) Patent No.: US 8,647,059 B1
(45) Date of Patent: Feb. 11, 2014

(54) PNEUMATIC ACTUATOR SYSTEM FOR A ROTATING BLADE

(76) Inventor: Joseph Szefi, State College, PA (US)

(*) Notice: Subject to any disclaimer, the term of this patent is extended or adjusted under 35 U.S.C. 154(b) by 451 days.

(21) Appl. No.: 13/020,333

(22) Filed: Feb. 3, 2011

Related U.S. Application Data (60) Provisional application No. 61/301,381, filed on Feb. 4, 2010.

(51) Int. Cl.
*F01D 5/12* (2006.01)

(52) U.S. Cl.
USPC ............... 416/1; 416/23; 416/132 R; 416/147

(58) Field of Classification Search
USPC ........ 416/23, 24, 98, 131, 132 R, 132 B, 142, 416/147, 240, 1; 244/198, 201, 212, 215
See application file for complete search history.

(56) References Cited

U.S. PATENT DOCUMENTS

| | | | | | |
|---|---|---|---|---|---|
| 3,915,414 | A | * | 10/1975 | Shoulders | 244/180 |
| 4,083,652 | A | * | 4/1978 | Isaacson | 416/84 |
| 4,464,980 | A | * | 8/1984 | Yoshida | 92/34 |
| 5,106,265 | A | * | 4/1992 | Holzem | 416/23 |
| 5,860,865 | A | * | 1/1999 | Smith | 464/180 |
| 6,200,096 | B1 | * | 3/2001 | Kohlhepp | 416/24 |

* cited by examiner

*Primary Examiner* — Edward Look
*Assistant Examiner* — Liam McDowell
(74) *Attorney, Agent, or Firm* — John J. Elnitski, Jr.

(57) ABSTRACT

A pneumatic actuator system to provide for actuation of a device on a rotor blade. A high pressure volume unit mounted on the rotor blade, including an air inlet to allow entrance of air into the high pressure volume. At least one actuator on the rotor blade to actuate a device on the rotor blade, where the at least one actuator is connected to the high pressure volume to receive air from the high pressure volume for actuation. An air release unit connected to the at least one actuator to allow release of air from the at least one actuator. An air control unit connected to the high pressure volume unit to control air flow into the at least one actuator and is connected to the air release unit to control release of air from the at least one actuator.

18 Claims, 10 Drawing Sheets

PNEUMATIC ACTUATOR SYSTEM FOR A ROTATING BLADE

This application claims the benefit of and incorporates by reference U.S. Provisional Application No. 61/301,381 filed Feb. 4, 2010.

BACKGROUND

The present invention generally relates to generated air pressure differentials that can be used to actuate mechanical devices. More specifically, the present invention relates to centrifugally generated air pressure differentials by rotor blades that can be used to actuate active rotor blade control surfaces.

The tips of propeller blades of a propeller driven fixed wing aircraft rotate in a directional plane that is usually perpendicular to the direction of flight. In contrast, ends of main rotor blades of a helicopter usually rotate in a directional plane that parallels the direction of flight. The aerodynamic environment of rotating helicopter rotor blades is non-symmetric, unsteady and three-dimensional. Compressibility effects are experienced on an advancing rotor blade. Reverse flow and dynamic stall occur on a retreating rotor blade and a returning wake is encountered under certain flight conditions. The environmental effects on the rotating blades results in large blade vibrations that are filtered through to the fuselage. The fuselage vibration arising primarily from the main rotor blades limits helicopter performance and reduces the structural life of helicopter components, which presents maintenance expense and reliability issues. The high vibration encounter also leads to pilot fatigue and poor ride quality. Significant research is presently dedicated toward realizing the goal of smooth and quiet helicopter flight to improve the cost effectiveness and wider community acceptance of helicopters.

Passive vibration absorbers and isolators are one solution, but lead to a large weight penalty and exhibit poor off-design performance. Active and smart vibration reduction techniques using adaptive control strategies that employ sensors and actuators enable performance and ride quality improvement. Improved vibration reduction can be achieved by placing the actuators as close as possible to the vibration source, in this case the main rotor blades. Higher harmonic control of a fixed swashplate superimposes a multi-cyclic pitch input on the rotor blades, which is beyond what is imposed by the primary flight controls. The next step beyond fixed swashplate actuation is on-blade actuation using active control surfaces to directly alter the rotor blade aerodynamic loads and load distributions. On-blade active systems would open a new technique for vibration control, aeromechanical stability augmentation, handling qualities enhancement and noise reduction.

There are two rotor blade control surface concepts that are particularly attractive for active control. The first concept incorporates trailing edge flaps to affect vibration control, where piezoelectric devices are often proposed as the actuation mechanism. In this approach, each trailing edge flap is a discrete element of the rotor blade and is not part of the direct load path. One of the advantages of a discrete actuation system is that multiple flaps can be mounted on a blade, offering greater control flexibility. The flap actuator designs that incorporate piezoelectric bender actuators have a low force output and in general, are restricted to small-scale wind tunnel models. Bender designs utilizing layered structures, bimorphs, and wing spar cantilevers have been investigated for small flaps in the range of 1-5 inches. These small flaps have achieved ±2° to ±5° flap deflection and reduced vibration. However, the larger deflections were for smaller flaps and most of the results were under either low load or low speed conditions. Piezoelectric stack actuators, typically used in larger scale applications, have a larger force output than benders but produce a smaller displacement. Designs that have incorporated lever-fulcrum and "X-frame" type amplification schemes have been investigated resulted in ±6° to ±4° flap deflection for a 4 inch and a 7 inch flap, respectively. For a larger full scale flap of about 36 inches, a "double X", X-frame type amplifier was also investigated. Flap deflections in the range of ±2-3° are expected. As of late, an induced shear PZT tube actuator was incorporated into a hinge amplification device to deflect full-scale rotor blade trailing edge flaps. Experimental bench top testing of a full-scale tube actuator flap system was conducted to validate the analysis. The experimental testing revealed that for an applied electric field of 3 kV/cm, the tube actuator deflected a representative full scale 12 inch flap ±2.8° at 0 RPM and ±1.4° for a 400 RPM condition.

The second concept for on-blade actuation that is being researched is the use of Miniature Trailing-Edge Effectors (MiTEs) on the rotor blades. MiTEs are an extension of the passive high-lift device, the Gurney flap. Gurney flaps are small flat plates, between 0.5 to 5 percent chord, fitted perpendicularly to the airfoil surface at or near the trailing edge of a wing or rotor blade. A MiTE is an active Gurney flap, which can be used to actively control the lift and moment distribution on a rotor blade. MiTEs also have the advantage of having very low actuator loads compared to those of traditional trailing-edge flaps. Recently, experimental and validated computational fluid dynamics research has been done on MiTEs and an unsteady aerodynamic model was created for MiTEs placed at the trailing edge. The model was modified to account for a MiTE placed at the trailing edge and up to the 85 percent chord position. The aerodynamic model was also incorporated into a rotor performance code software to predict the effect of MiTEs on rotor performance and explore the ability to extend the flight envelope of the RAH-66 Comanche. The maximum velocity of Comanche was shown to have the potential increase of 20 percent with the increased use of transonic airfoils as facilitated through the use of MiTEs on the outboard section of the rotor blades. Investigations have also been made on increasing the service ceiling of the Comanche, which showed a potential improvement of 8 percent with the use of MiTEs. MiTEs could be used in place of active flaps for vibration control, as the MiTEs appear to be ideal in providing the required changes in lift and moments required for individual blade control. An additional advantage of using MiTEs is that they provide this potential with significantly lower actuator loads and are insensitive to compressibility effects.

There exist several reasons why piezoelectric actuated on-blade surfaces are problematic. Piezoelectric material is quite heavy with a density of nearly 7500 kg/m^3, which is nearly equal to that of steel. In helicopters in particular, weight is a critical design parameter. In general, several pounds of extra weight must be added to a helicopter blade to incorporate a trailing edge flap. Because each individual actuator will add a significant amount of weight, providing redundancy in the flap actuation design will necessarily imply that the actuator weight will be at least doubled. In addition to the weight issue, piezoelectric material is also very brittle. Piezoelectric actuators often fail in service due to multi-axial loads on the rotor blades that are unintentionally applied because of their brittle nature. The high failure rate of piezoelectric actuators would most likely imply that actuator redundancy would be necessary, which again would result in a high weight penalty. In addition, the output force of piezoelectric materials is directly proportional to the applied voltage. Therefore, a high voltage (~1000V) is required to obtain the full stroke of the actuator. Reliably supplying this high voltage out to the rotating frame of a helicopter is difficult to achieve through existing electric slip rings. Finally, piezoelectric stack actuators require significant structural housings to provide precompression and mechanical linkages to amplify extremely small piezoelectric strain of about 0.15%, which necessarily results in large weight penalties for on-blade actuation. A lighter, more reliable and more redundant actuation method would offer helicopter designers a more feasible and attractive option for on-blade actuation, which the current invention supplies.

Another method of actuating active blade surfaces could be through the use of electromechanical motors. Typically, electromechanical motors are geared to rotary outputs that have fixed amplitudes. Therefore, the ability to achieve varying dynamic flap amplitudes at different frequencies would be difficult, if not impossible. An alternative design might employ a jack screw geared to the motor output. The axis of the jack screw would be attached to the flap axis and the motor would need to reverse directions at high frequencies of about 20-30 Hz. This design would suffer from a possible undesirable failure mode, where the motor might fail when the flap is fully deflected, causing an unstable aerodynamic effect. Finally, employing an electromechanical motor with enough torque or force to deflect a full-scale trailing edge flap would result in a significant weight penalty.

It is an object of the present invention to provide actuation of devices on a rotor blade with air pressure generated by the rotor blade.

It is an object of the present invention to provide actuation of devices on a rotor blade with minimal connections off of the rotor blade.

SUMMARY OF THE INVENTION

A pneumatic actuator system to provide for actuation of a device on a rotor blade. A high pressure volume unit mounted on the rotor blade, including an air inlet to allow entrance of air into the high pressure volume. At least one actuator on the rotor blade to actuate a device on the rotor blade, where the at least one actuator is connected to the high pressure volume to receive air from the high pressure volume for actuation. An air release unit connected to the at least one actuator to allow release of air from the at least one actuator. An air control unit connected to the high pressure volume unit to control air flow into the at least one actuator and is connected to the air release unit to control release of air from the at least one actuator.

DETAILED DESCRIPTION

The present invention is a pneumatic actuator system that uses centrifugally generated air pressure differential from a rotor blade. The pneumatic actuator system removes the need to supply an auxiliary pressure source at the rotor blade and allows the rotor blades to act as a pump to supply an air pressure differential for actuation of pneumatic actuators. The pneumatic actuator system uses a source of air pressure differentials associated with rotating rotor blades for device actuation or energy harvesting. On-blade actuation of devices using the pressure differential provides a lightweight, low power actuating mechanism. On-blade actuation systems generally are used to actuate moving blade surface parts that alter the lift and drag coefficients of the rotor blade, thus tailoring rotor performance. This is especially applicable to helicopters, but can be used on aircraft propellers, windmills and other rotating blades. To explain the pneumatic actuator system, it will be demonstrated on a helicopter blade.

The pneumatic actuator system uses separate volumes in the rotor blade that span a portion of the length of the interior of the rotor blade. During rotor blade rotation, one volume develops a relatively high pressure and the other volume develops a relatively low pressure when compared to the atmospheric pressure. Pressure diaphragms are used to actuate active blade surfaces that can be either filled or depleted with air resulting from the pressure differential that exists between the two volumes. Valves connect the two volumes to the pressure diaphragms to control the pressure levels in the diaphragms. Also, a pneumatic generator can be placed between the pressure differential volumes to generate electricity on board the rotor blade.

Figure 1:
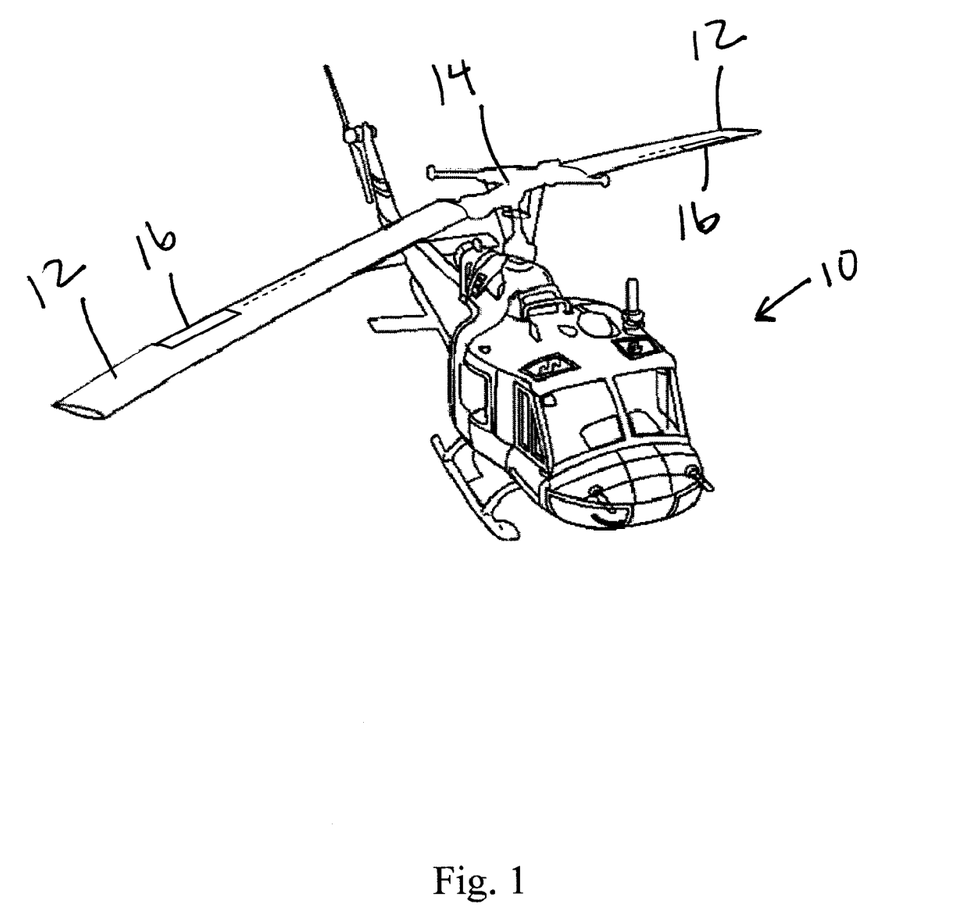
FIG. 1 is a perspective view of a helicopter with an active rotor blade surface according to the present invention.
Figure 2:
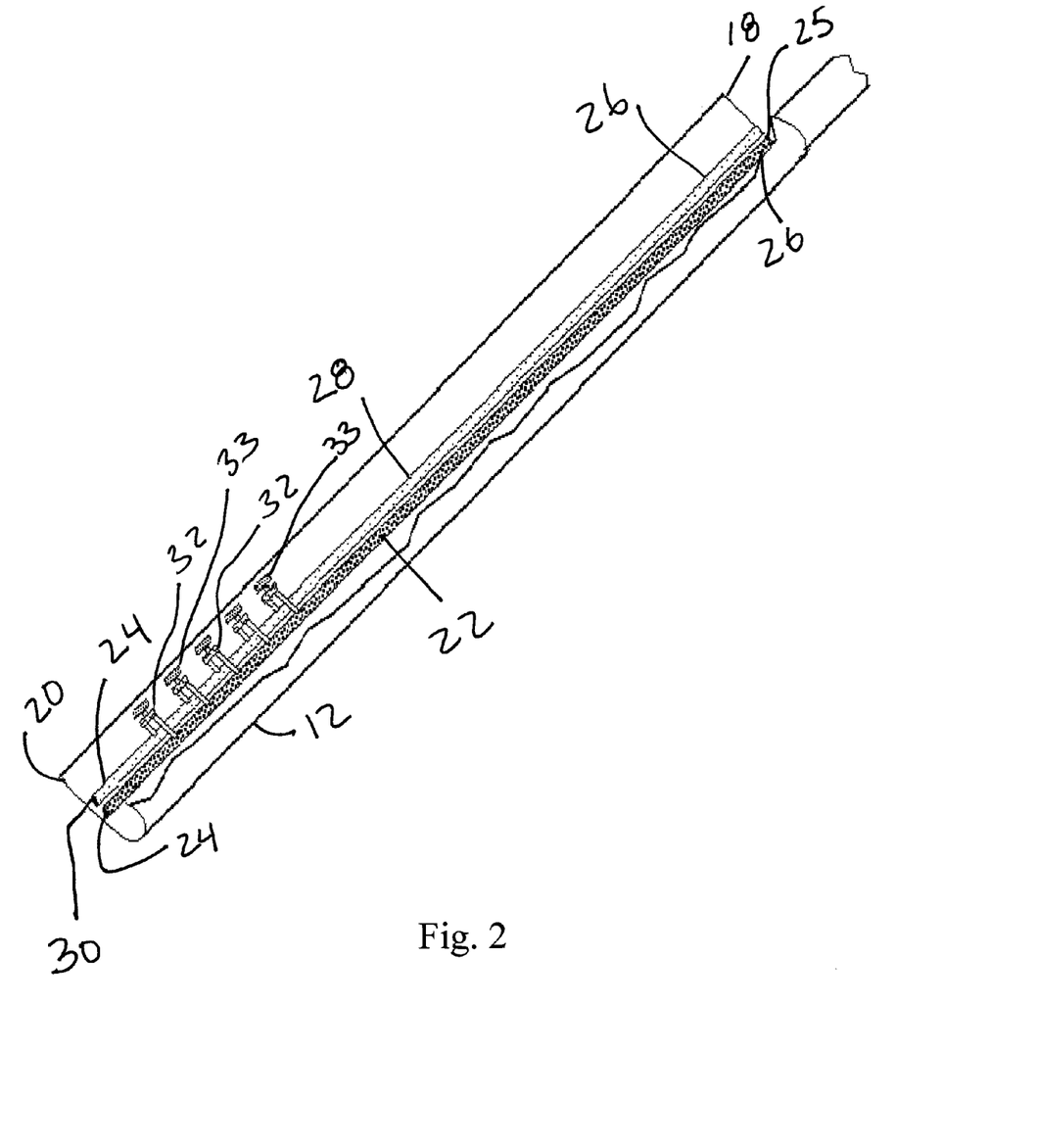
FIG. 2 is a perspective cutaway of a rotor blade with pneumatic actuator system according to the present invention.

FIG. 1 shows a helicopter 10 with two rotor blades 12 connected to a rotor hub 14 that forms the main rotor. The rotor blades 12 are shown with active rotor blade surfaces 16. The active rotor blade surfaces 16 may be leading edge flaps, trailing edge flaps, Miniature Trailing Edge Effectors (MiTEs), shape morphing cross sections, or a cross sectional shape changing mechanism of the airfoil of the rotor blade. FIG. 2 shows one of the rotor blades 12 having a blade hub end 18 and a blade tip 20, where the blade hub end 18 connects to the rotor hub 14.

The rotor blade 12 of FIG. 2 includes a high pressure volume unit 22, which spans an internal portion of the length of the rotor blade 12 from the blade hub end 18 toward the blade tip 20. The high pressure volume unit 22 is shown as a sealed cylindrical tube with a unit tip end 24 and a unit hub end 26, but the high pressure volume unit 22 could be other shapes. The high pressure volume unit 22 includes an air inlet 25 at the unit hub end 26 which leads to the outside of the rotor blade 12. The air inlet 25 of the high pressure volume 22 is a small hole that is open to the atmosphere and is ideally located as close as possible to center of rotation of the rotor blade 12. The unit tip end 26 of the high pressure volume unit 22 that is closest to the blade tip 20 of the rotor blade 12 is sealed. During rotor blade 12 rotation, the high pressure volume unit 22 will develop an air pressure that is larger in absolute magnitude when compared to the outside atmospheric pressure due to centripetal acceleration of the air about the center of rotation of the rotor blade 12 at the rotor hub 14. During rotor blade rotation that induces the centrifugal forces, the pressure level within the high pressure volume unit 22 increases exponentially with increasing radial location from the unit hub end 26, with the highest pressure being located at the unit tip end 24.

The rotor blade 12 of FIG. 2 includes a low pressure volume unit 28, which spans the internal portion of the length of the rotor blade 12 from the blade hub end 18 to the blade tip 20. The low pressure volume unit 28 is shown as a cylindrical tube with a unit tip end 24 and a unit hub end 26, but the low pressure volume unit 28 could be other shapes. The low pressure volume unit 28 includes an air outlet 30 at the unit tip end 24 that leads to the outside of the rotor blade 12. The air outlet 30 is a small hole that is open to the atmosphere and is ideally located as close as possible to the blade tip 20 of the rotor blade 12. The unit hub end 26 of the low pressure volume unit 28 that is closest to the center of rotation of the rotor blade 12 is sealed. During blade rotation, the low pressure volume unit 28 will develop a pressure that is smaller in absolute magnitude, when compared to the outside atmospheric pressure. The lower pressure is due to the air outlet 30 being exposed to a relatively low dynamic pressure created by the high tip velocity of the rotor blade 12 during rotation. During rotor blade rotation that induces the centrifugal forces, the pressure level within the low pressure volume unit 28 increases exponentially with increasing radial location from the unit hub end 26, with the highest pressure being located at the unit tip end 24. Both the high pressure volume unit 22 and low pressure volume unit 28 can be as simple as plastic tubing.

Figure 3:
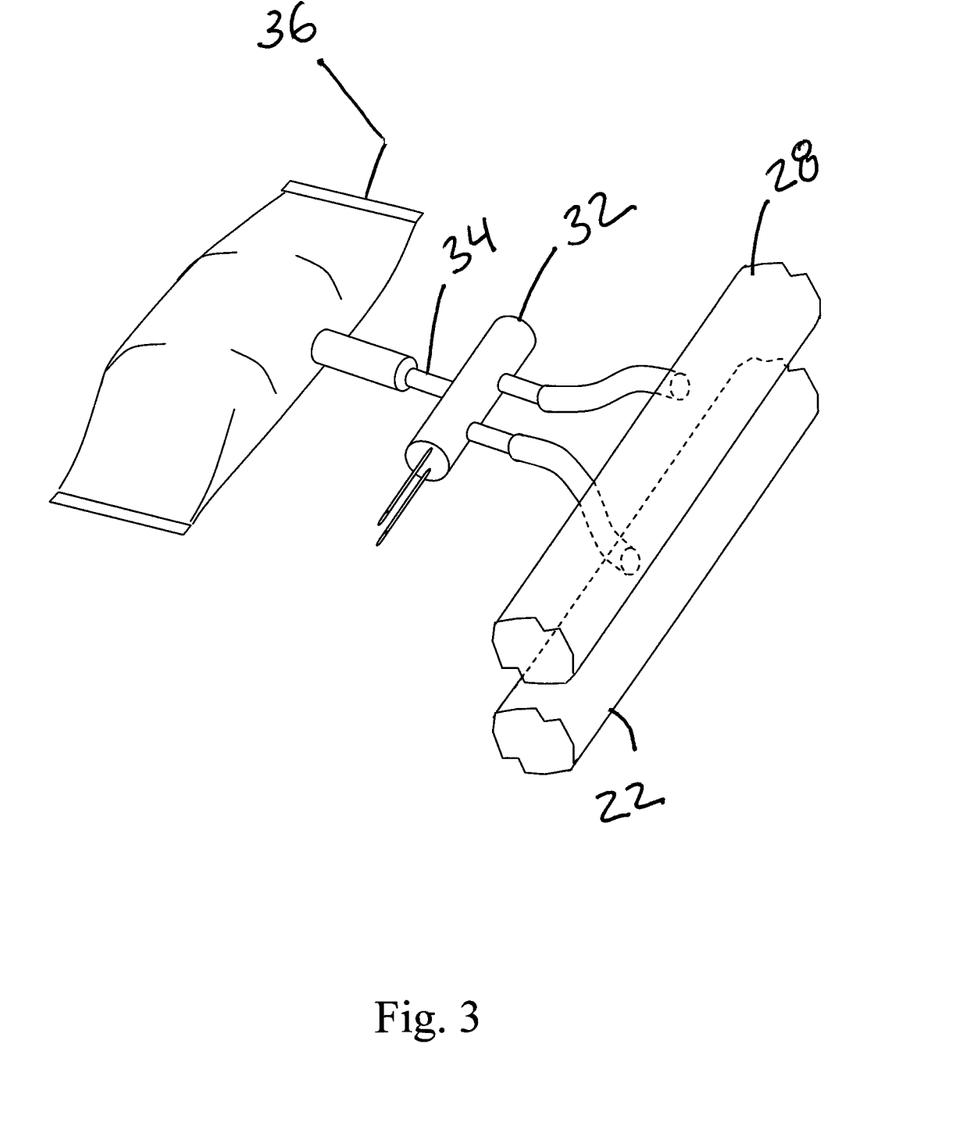
FIG. 3 is a perspective cutaway of a pneumatic actuator system according to the present invention.

FIG. 2 shows several active valves 32 connected to the high pressure volume unit 22 along the length of the rotor blade 12, which act as sub outlets from the high pressure volume unit 22 to an actuator 33. FIG. 2 shows several active valves 32 connected to the low pressure volume unit 28 along the length of the rotor blade 12, which act as sub outlets to allow air to enter the low pressure volume unit 28 from an actuator 33. As shown in FIGS. 2-3, each active valve 32 is connected to both the high pressure volume unit 22 and the low pressure volume unit 28. The active valve 32 is a very small valve that can be controlled electrically to open and close. Not shown is an alternative embodiment of the present invention, where one or more active valves 32 are connected only to either the high pressure volume unit 22 or the low pressure volume unit 28. The active valves 32 may be one-way, two-way, three-way, or four-way type valves. The active valves 32 are connected such that the high pressure volume unit 22 is on one side of the valve passage of the active valve 32 and the low pressure volume unit 28 is on other side of the valve passage of the active valve 32 from the high pressure volume unit 22. The active valves 32 are electrically activated to open and close the valve passage in order to alter the direction of air flowing through the active valves 32. The direction of flow through the active valves 32 depends on the relative magnitude of the pressures of the high pressure volume unit 22 and low pressure volume unit 28 on either side of the valve passages that are open during blade rotation. An example of the active valve 32 is a miniature solenoid plunger type valve, however, any type of valve may be used that is capable of controlling air flow.

Figure 4:
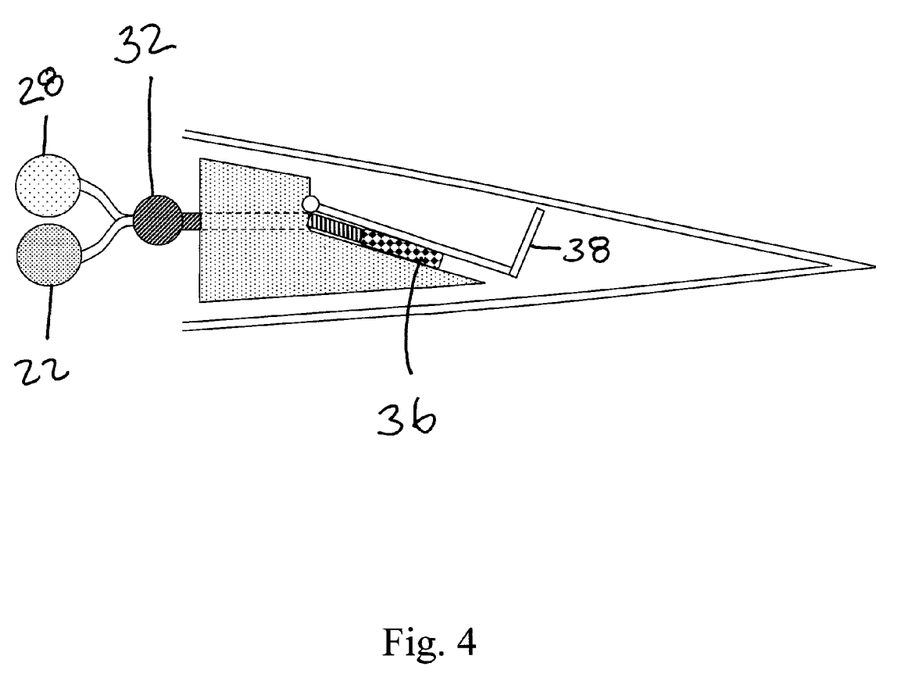
FIG. 4 is a cross sectional ay view of a pneumatic actuator system in a rotor blade according to the present invention.
Figure 5:
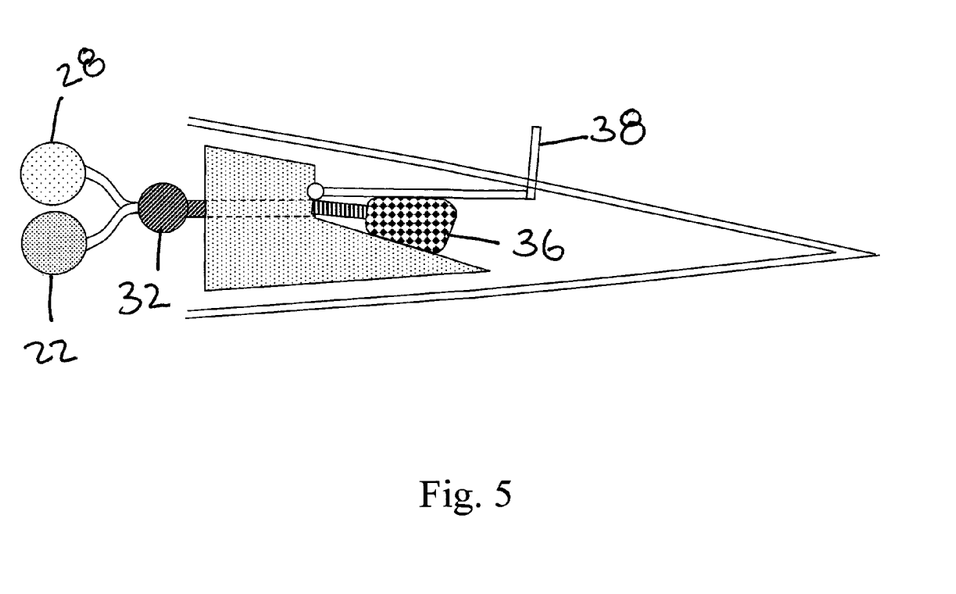
FIG. 5 is a cross sectional ay view of a pneumatic actuator system in a rotor blade according to the present invention.

FIG. 3 shows at least one outlet 34 of the active valve 32 connected to a pressure diaphragm 36, which is a volume that can change shape and not allow air to enter or escape, except through the active valve 32 connection. A pressure diaphragm is a form of an actuator. Changing the volume and pressure of the pressure diaphragm 36 to change its shape is used to move the active rotor blade surface 38 by filling or depleting air in the pressure diaphragm 36 using the pressure differential that exist between the high pressure volume unit 22 and the low pressure volume unit 28, as depicted in FIGS. 4-5. As shown in FIG. 4, when the air is depleted from the pressure diaphragm 36, the active rotor blade surface 38 is retracted due to the change in shape of the pressure diaphragm 36. As shown in FIG. 5, when the pressure diaphragm 36 is filled with air, the active rotor blade surface 38 is extended due to the change is shape of the pressure diaphragm 36. All of the air that used to change and fill the shape of the pressure diaphragm 36 is ingested through the air inlet 25. The air that exits to deplete the pressure diaphragm 36 is ultimately exhausted through the air outlet 30.

Figure 6:
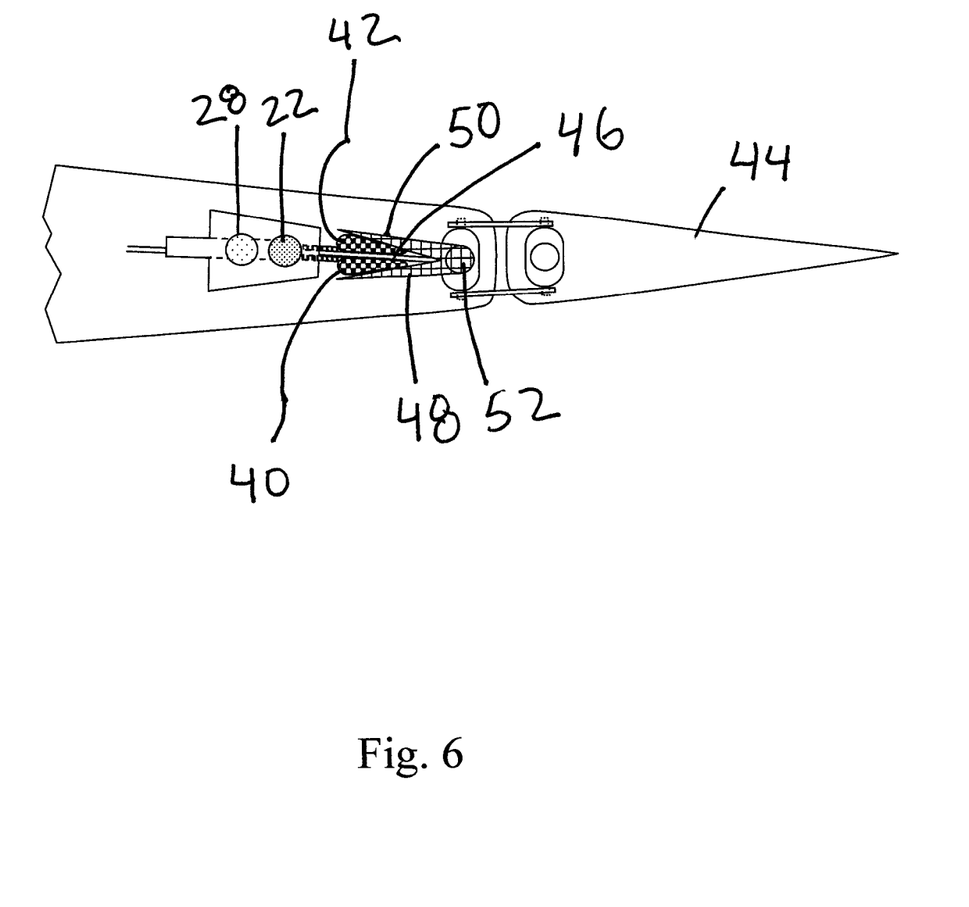
FIG. 6 is a cross sectional ay view of a pneumatic actuator system in a rotor blade according to the present invention.
Figure 7:
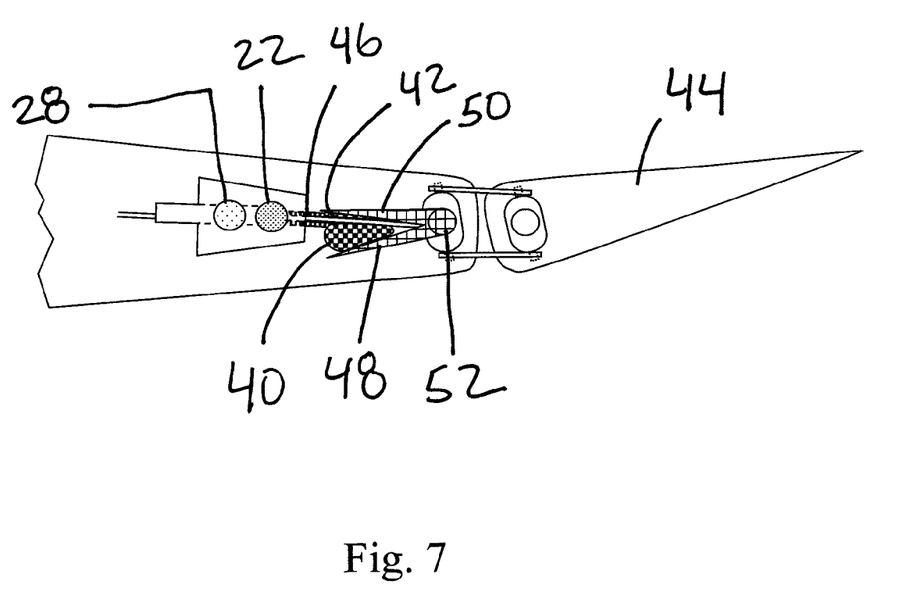
FIG. 7 is a cross sectional ay view of a pneumatic actuator system in a rotor blade according to the present invention.

FIGS. 6-7 show the high pressure volume unit 22, low pressure volume unit 28, first pressure diaphragm 40, second pressure diaphragm 42 and active valves 32 connected together to actuate a hinged surface 44. A pressure diaphragm divider 46 separates the first pressure diaphragm 40 from the second pressure diaphragm 42 so that the first pressure diaphragm 40 and the second pressure diaphragm 42 operate in opposition to each other. The pressure diaphragm divider 46 is rigidly connected in the rotor blade 12 and does not move with the hinged surface 44. The first pressure diaphragm 40 is connected to both the high pressure volume unit 22 and the low pressure volume unit 28 using active valves 32. The second pressure diaphragm 42 is connected to both the high pressure volume unit 22 and the low pressure volume unit 28 using active valves 20. The second pressure diaphragm 42 is configured to operate in an opposite manner to the first pressure diaphragm 40. Therefore, if the first pressure diaphragm 40 is inflated, then the second pressure diaphragm 42 is deflated in order to move the hinged surface 44. The direction of rotation of the hinged surface 44 is determined by the individual states of the active valves 32 connected to the first pressure diaphragm 40 and second pressure diaphragm 42. FIGS. 6-7 show the hinged surface 44 includes a first arm 48 and a second arm 50. The first arm 48 is in contact with the first pressure diaphragm 40 and the second arm 50 is in contact with the second pressure diaphragm 42. FIG. 6 shows the hinged surface 44 in a neutral position, whereby both the first pressure diaphragm 40 and second pressure diaphragm 42 are equally inflated between the pressure diaphragm divider 46 and the first arm 48 and second arm 50, respectively. FIG. 7 shows the first pressure diaphragm 40 deflated and the second pressure diaphragm 42 inflated to a greater extent from FIG. 6. Decreasing air pressure in first pressure diaphragm 40 and increasing air pressure in the second pressure diaphragm 42 causes the hinge surface 44 to move about the hinge 52, due to the interactions of the pressure diaphragms 40, 42 between the pressure diaphragm divider 46 and the first and second arms 48, 50. It is envisioned that an air control unit is used to control the inflation and deflation of actuators such as diaphragms by manipulating the active valves. The air control unit would be an electronic device to control the active valves 32 electrically.

Figure 8:
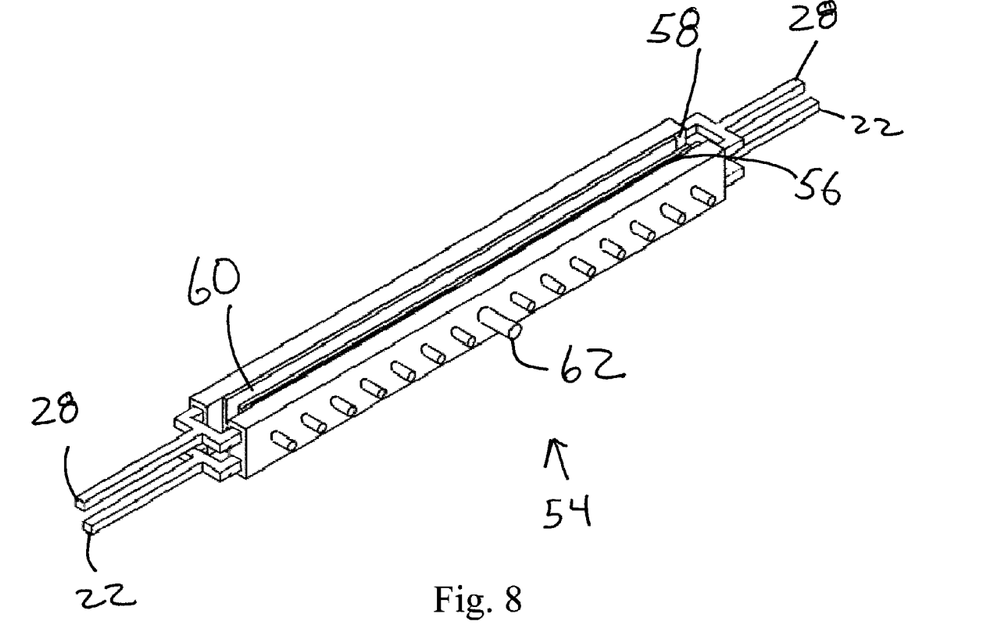
FIG. 8 is a perspective view of a linear pneumatic actuator according to the present invention.
Figure 9:
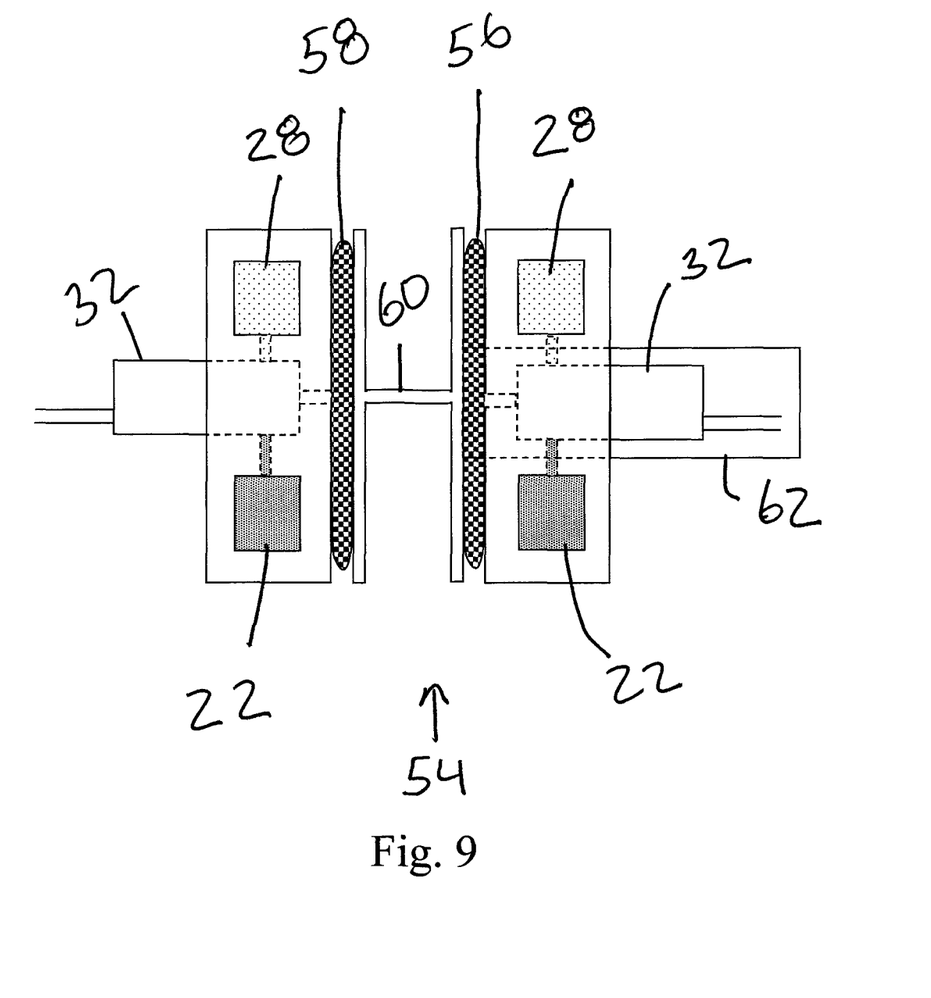
FIG. 9 is a cross sectional view of a linear pneumatic actuator according to the present invention.
Figure 10:
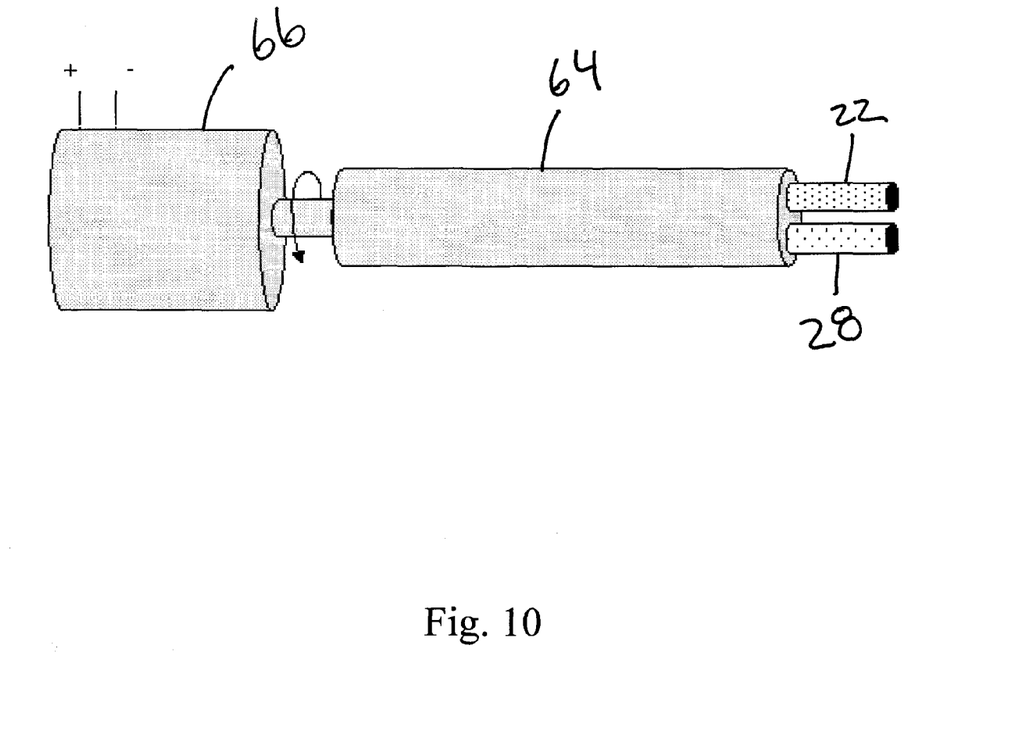
FIG. 10 is a perspective view of a pneumatic actuator system connected to a pneumatic motor and electrical generator according to the present invention.

FIGS. 8-9 show a form of a linear pneumatic actuator 54 using the concepts of the present invention. The linear pneumatic actuator 54 can be used on a rotor blade 12. The linear pneumatic actuator 54 has at least one outlet of one or more active valves 32 connected to each of a first pressure diaphragm 56 and a second pressure diaphragm 58. The second pressure diaphragm 58 opposes the first pressure diaphragm 56 and operates in an opposite manner to the first pressure diaphragm 56. The first pressure diaphragm 56 is connected to both the high pressure volume unit 22 and the low pressure volume unit 28 via the active valves 32 and the second pressure diaphragm 58 is connected to the both the high pressure volume unit 22 and the low pressure volume unit 28 via the active valves 32. The first pressure diaphragms 56 and the second pressure diaphragm 58 are separated by a movable divider 60 that resists bending. Movement of the movable divider 60 is between the first pressure diaphragms 56 and the second pressure diaphragm 58. The movable divider 60 is connected to a linear actuator output 62. The direction of travel of the linear actuator output 62 is determined by the state of the active valves 32 connected to the first pressure diaphragm 56 and second pressure diaphragm 58. The linear actuator output 62 can be connected to mechanical linkages that ultimately can be used to move an active rotor blade surface. All of the air that used to change the shape of the first pressure diaphragm 56 and the second pressure diaphragm 58 is ingested through the air inlet 25 on the rotor blade 12. All of the air that exits the first pressure diaphragm 56 and the second pressure diaphragm 58 is ultimately exhausted through the air outlet 30. The movable divider 60 is moved to move the linear actuator output 62, which is accomplished by inflating and deflating the first pressure diaphragm 56 and the second pressure diaphragm 58. FIG. 10 shows the connecting of the high pressure volume unit 22 and the low pressure volume unit 28 to a pneumatic motor 64, whereby the pneumatic is another form of an actuator. The pressure differential between the high pressure volume unit 22 and the low pressure volume unit 28 causes the motor output to rotate. The rotational output of the pneumatic motor 64 is connected to an electrical generator 66, which generates electrical power that is available on the rotor blade 12, if so mounted on the rotor blade 12. It is envision that the low pressure volume unit 28 could be replaced by an air release valve acting as an air release unit to release air pressure into the rotor blade 12 or to the outside surface of the rotor blade 12 from an actuator, but might not be as effective as the lower pressured volume unit 28 described.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof

I claim:

1. A pneumatic actuator system for use on a rotor blade to actuate a device, comprising:
    a rotor blade, said rotor blade having a blade hub end, a blade tip and a length between said blade hub end and said blade tip;
    a high pressure volume unit mounted on said rotor blade along said length of said rotor blade, said high pressure volume unit including a unit hub end near said blade hub end and a unit tip end extending towards said blade tip, said unit hub end including an air inlet to allow entrance of air into said high pressure volume;
    at least one actuator on said rotor blade to actuate a device on said rotor blade, said at least one actuator connected to said high pressure volume to receive air from said high pressure volume for actuation;
    an air release unit connected to said at least one actuator to allow release of air from said at least one actuator, wherein said air release unit is a low pressure volume unit mounted on said rotor blade along said length of said rotor blade, said low pressure volume unit including a unit tip end near said blade tip and a unit hub end extending towards said blade hub end, said unit hub end including an air outlet to allow exit of air from said low pressure volume unit that is received from said at least one actuator; and
    an air control unit connected to said high pressure volume unit to control air flow into said at least one actuator and connected to said air release unit to control release of air from said at least one actuator.

2. The pneumatic actuator system of claim 1, wherein said high pressure volume unit is mounted within an interior of said rotor blade.

3. The pneumatic actuator system of claim 1, wherein said low pressure volume unit is mounted within an interior of said rotor blade.

4. The pneumatic actuator system of claim 1, wherein said at least one actuator is a diaphragm which inflates and deflates based on operation of said air control unit.

5. The pneumatic actuator system of claim 4, wherein said device includes at least one actuator between a rigid surface and a movable part of said device to cause movement of said movable part due to inflation and deflation of said diaphragm.

6. The pneumatic actuator system of claim 1, wherein said air control unit includes at least one valve between said high pressure volume unit and said at least one actuator to control flow of air into said at least one actuator from said high pressure volume unit.

7. The pneumatic actuator system of claim 1, wherein said air control unit includes at least one valve between said low pressure volume unit and said at least one actuator to control flow of air from said at least one actuator to said low pressure volume unit.

8. The pneumatic actuator system of claim 1, wherein said actuator is a pneumatic motor to operate said device.

9. The pneumatic actuator system of claim 1, wherein said high pressure volume is a cylinder shaped tube.

10. The pneumatic actuator system of claim 1, wherein said low pressure volume is a cylinder shaped tube.

11. The pneumatic actuator system of claim 1, wherein said low pressure volume contains a lower absolute pressure than atmospheric pressure during rotation of said rotor blade.

12. A pneumatic actuator system for use on a rotor blade to actuate a device, comprising:
    a rotor blade, said rotor blade having a blade hub end, a blade tip and a length between said blade hub end and said blade tip;
    a high pressure volume unit mounted on said rotor blade along said length of said rotor blade, said high pressure volume unit including a unit hub end near said blade hub end and a unit tip end extending towards said blade tip, said unit hub end including an air inlet to allow entrance of air into said high pressure volume;
    at least one actuator on said rotor blade to actuate a device on said rotor blade, said at least one actuator connected to said high pressure volume to receive air from said high pressure volume for actuation;
    an air release unit connected to said at least one actuator to allow release of air from said at least one actuator;
    an air control unit connected to said high pressure volume unit to control air flow into said at least one actuator and connected to said air release unit to control release of air from said at least one actuator; and
    wherein said high pressure volume contains a higher absolute pressure than atmospheric pressure during rotation of said rotor blade.

13. A pneumatic actuator system for use on a rotor blade to actuate a device, comprising:

a rotor blade, said rotor blade having a blade hub end, a blade tip and a length between said blade hub end and said blade tip;

a high pressure volume unit mounted on said rotor blade along said length of said rotor blade, said high pressure volume unit including a unit hub end near said blade hub end and a unit tip end extending towards said blade tip, said unit hub end including an air inlet to allow entrance of air into said high pressure volume;

at least one actuator on said rotor blade to actuate a device on said rotor blade, said at least one actuator connected to said high pressure volume to receive air from said high pressure volume for actuation;

an air release unit connected to said at least one actuator to allow release of air from said at least one actuator;

an air control unit connected to said high pressure volume unit to control air flow into said at least one actuator and connected to said air release unit to control release of air from said at least one actuator; and wherein said device includes a rigid divider between two of said at least one actuator to separate said two of said at least one actuator, wherein each of said two of said at least one actuator is a diaphragm which inflates and deflates based on operation of said air control unit and wherein each of said diaphragms are position between said rigid divider and a movable part of said device to cause movement of said movable part due to inflation and deflation of said diaphragms.

14. A pneumatic actuator system for use on a rotor blade to actuate a device, comprising:

a rotor blade, said rotor blade having a blade hub end, a blade tip and a length between said blade hub end and said blade tip;

a high pressure volume unit mounted on said rotor blade along said length of said rotor blade, said high pressure volume unit including a unit hub end near said blade hub end and a unit tip end extending towards said blade tip, said unit hub end including an air inlet to allow entrance of air into said high pressure volume;

at least one actuator on said rotor blade to actuate a device on said rotor blade, said at least one actuator connected to said high pressure volume to receive air from said high pressure volume for actuation;

an air release unit connected to said at least one actuator to allow release of air from said at least one actuator;

an air control unit connected to said high pressure volume unit to control air flow into said at least one actuator and connected to said air release unit to control release of air from said at least one actuator; and wherein said device includes a movable divider between two of said at least one actuator to separate said two of said at least one actuator, wherein each of said two of said at least one actuator is a diaphragm which inflates and deflates based on operation of said air control unit and wherein each of said diaphragms are positioned against the movable divider to move the movable divider due to inflation and deflation of said diaphragms and wherein said movable divider includes linear actuator output that can be connected to the device and moves with the movable divider.

15. A method of actuating a device on a rotor blade using a pneumatic actuator system, comprising:

rotating the rotor blade that has a blade hub end, a blade tip and a length between the blade hub end and the blade tip, such that air pressure rises above atmospheric pressure within a high pressure volume unit mounted on the rotor blade along the length of the rotor blade, the high pressure volume unit including a unit tip end near the blade tip and a unit hub end near the blade hub end, the unit hub end including an air inlet to allow entrance of air into the high pressure volume during rotation;

inputting air into at least one actuator on the rotor blade from the high pressure volume unit to actuate the device;

releasing air from the at least one actuator unit when necessary to control the least one actuator using an air release unit connected to the at least one actuator unit, wherein releasing of air using the air release unit is by a low pressure volume unit mounted on the rotor blade along the length of the rotor blade, the low pressure volume unit including a unit tip end near the blade tip and a unit hub end near the blade hub end, the unit hub end including an air outlet to allow exit of air from the low pressure volume unit that is received from the at least one actuator during rotation of the rotor due to the low pressure volume unit having a lower pressure than the atmospheric pressure during rotation of the rotor blade; and using an air control unit connected to the high pressure volume unit and to control air flow into the at least one actuator and connected to the air release unit to control release of air from the at least one actuator.

16. The method of claim 15, wherein actuating each of the at least one actuator is by using a diaphragm as the at least one actuator which inflates and deflates based on operation of the air control unit to cause actuation of the device.

17. The pneumatic actuator system of claim 16, wherein actuating the device is caused by the at least one actuator being between a rigid surface and a movable part of the device to cause movement of the movable part due to inflation and deflation of the diaphragm.

18. A method of actuating a device on a rotor blade using a pneumatic actuator system, comprising:

rotating the rotor blade that has a blade hub end, a blade tip and a length between the blade hub end and the blade tip, such that air pressure rises above atmospheric pressure within a high pressure volume unit mounted on the rotor blade along the length of the rotor blade, the high pressure volume unit including a unit tip end near the blade tip and a unit hub end near the blade hub end, the unit hub end including an air inlet to allow entrance of air into the high pressure volume during rotation;

inputting air into at least one actuator on the rotor blade from the high pressure volume unit to actuate the device;

releasing air from the at least one actuator unit when necessary to control the least one actuator using an air release unit connected to the at least one actuator unit;

using an air control unit connected to the high pressure volume unit and to control air flow into the at least one actuator and connected to the air release unit to control release of air from the at least one actuator; and wherein actuating the device is caused by a rigid divider between two of the at least one actuator to separate the two of the at least one actuator that are each a diaphragm which inflates and deflates based on operation of the air control unit because each of the diaphragms are position between the rigid divider and a movable part of the device to cause movement of the movable part due to inflation and deflation of the diaphragms.

* * * * *